US00RE37113E

(19) United States
(12) Reissued Patent
Shimada

(10) Patent Number: US RE37,113 E
(45) Date of Reissued Patent: Mar. 27, 2001

(54) STEP LIGHTING

(75) Inventor: Takehiko Shimada, Rolling Hills Estates, CA (US)

(73) Assignee: Shimada Enterprises Inc., Santa Fe Springs, CA (US)

(21) Appl. No.: 09/354,543

(22) Filed: Jul. 15, 1999

Related U.S. Patent Documents

Reissue of:
(64) Patent No.: 5,810,468
Issued: Sep. 22, 1998
Appl. No.: 08/867,100
Filed: Jun. 2, 1997

(51) Int. Cl.[7] ..... F21S 4/00
(52) U.S. Cl. ..... 362/146; 362/245; 362/247; 362/249
(58) Field of Search ..... 362/145, 146, 362/236, 240, 241, 244, 245, 247, 249

(56) References Cited

U.S. PATENT DOCUMENTS

| | | | | |
|---|---|---|---|---|
| Re. 32,899 | * | 4/1989 | Laidman | 362/226 |
| D. 311,588 | * | 10/1990 | Nagano | D26/24 |
| D. 312,135 | * | 11/1990 | Nagano | D26/2 |
| 934,122 | * | 9/1909 | Woodman | 362/146 |
| 2,691,718 | * | 10/1954 | Bowers | 362/146 |
| 2,756,323 | * | 7/1956 | Tusly | 362/146 |
| 3,885,144 | * | 5/1975 | Lewis et al. | 362/146 |
| 4,271,458 | * | 6/1981 | George, Jr. | 362/236 |
| 4,414,609 | * | 11/1983 | Shemitz | 362/249 |
| 4,544,996 | * | 10/1985 | George | 362/238 |
| 4,591,954 | * | 5/1986 | Kawamura et al. | 362/236 |
| 4,600,975 | * | 7/1986 | Roberts | 362/249 |
| 4,612,606 | * | 9/1986 | Roberts | 362/146 |
| 4,625,266 | * | 11/1986 | Winter | 362/146 |
| 4,665,470 | * | 5/1987 | George, Jr. | 362/236 |
| 5,045,981 | * | 9/1991 | Nagano | 362/219 |
| 5,222,799 | * | 6/1993 | Sears et al. | 362/146 |
| 5,430,627 | * | 7/1995 | Nagano | 362/146 |

FOREIGN PATENT DOCUMENTS

| | | | |
|---|---|---|---|
| 0 152 079 A2 | * | 8/1985 | (DE) . |
| 88 15 598 U | * | 4/1989 | (DE) . |
| 4446693 A1 | * | 6/1996 | (DE) . |
| 2 099 036 | * | 12/1982 | (GB) . |
| 2 142 672 | * | 1/1985 | (GB) . |
| 2 185 503 | * | 7/1987 | (GB) . |

OTHER PUBLICATIONS

Tivoli Brochure, Escort Lights, Aisle Lighting System, 1969 (4 pages).*

* cited by examiner

*Primary Examiner*—Alan Cariaso
(74) *Attorney, Agent, or Firm*—Lyon & Lyon LLP

(57) ABSTRACT

There is disclosed herein a step lighting fixture including an extrusion having a single channel for receiving a light directing member which directs light from a single lighting string both upwardly and downwardly with respect to a stair edge or stair nose. This enables the edge of a stair and the riser thereof or next lower step to be readily seen by one either descending or ascending the stair or stairway. The light directing member can include a pair of reflectors for reflecting light upwardly and downwardly. Alternatively, it can include a single reflector for reflecting light upwardly, and another section, either clear, segmented or both clear and segmented, for directing light downwardly.

37 Claims, 5 Drawing Sheets

STEP LIGHTING

Matter enclosed in heavy brackets [ ] appears in the original patent but forms no part of this reissue specification; matter printed in italics indicates the additions made by reissue.

The present invention relates to lighting systems, and more particularly to step lighting for stairway steps for providing light directed upwardly and downwardly from a single lighting system.

BACKGROUND OF THE INVENTION

Various forms of lighting systems have been devised for lighting aisles, stairs, floors, ceilings, and the like. Typically, low voltage string lighting systems are used which incorporate an incandescent or LED lighting strip having a number of spaced light bulbs or light sources.

In the case of steps and stairs, typically one or more stair "nosing" strips are provided at the edge or "nose" of each stair. For a number of years these devices have been provided for illuminating either upwardly from the forward edge of the stair or downwardly onto the riser and/or the next lower step so that the edge of each stair is illuminated whether one is walking up or down the stairway. Lighting systems of this nature are particularly desirable and useful in environments where the lighting level is low, such as in motion picture theaters and the like. With the advent of "stadium" type seating in motion picture theaters, stairs are more common in these theaters today, thereby creating a further need for suitable stair edge nose lighting.

Various forms of extrusions, either of metal such as aluminum, or plastic have been devised for holding a string of spaced light sources on a stair nose for either illumination upwardly or downwardly, or both. Typical lighting systems of this nature for illuminating both upwardly and downwardly involve either an extrusion for containing two sets of lights, or plural extrusions which are joined together with each holding a set of lights, for providing the upward and downward lighting. Generally, these lighting systems are relatively complicated to because of the dual lighting systems involved.

SUMMARY OF THE INVENTION

Accordingly, the present invention provides an improved step lighting system for the stair edge or nose, and wherein a single lighting string provides both the upward and downward illumination. In one embodiment, a combined lens and reflector is provided to allow light from a string of lights to be reflected upwardly and light from that string to impinge through the lens downwardly toward the riser and/or step below. In another embodiment, the extrusion houses a prism-type lens assembly for directing light both upwardly and downwardly. In another embodiment, the extrusion houses a dual reflector system for reflecting light from a light string both upwardly and downwardly. In a still further and preferred embodiment, the extension houses a lens and prism-type lens assembly for directing light both upwardly and downwardly but with improved downward illumination. In each instance, the extrusion may include slots at either end thereof for receiving the ends of carpet, such as carpet on the step and carpet on the riser.

Accordingly, it is an object of the present invention to provide an improved lighting system.

An additional object of the present invention is to provide an improved step nose lighting system.

A further object of the present invention is to provide a single extrusion for a stair nose for holding a light directing member for directing light from a single string of lights both upwardly and downwardly from the vicinity of a stair edge.

BRIEF DESCRIPTION OF THE DRAWINGS

These and other objects and features of the present invention will become better understood through a consideration of the following description taken in conjunction with the drawings in which.

DETAILED DESCRIPTION

Figure 1:
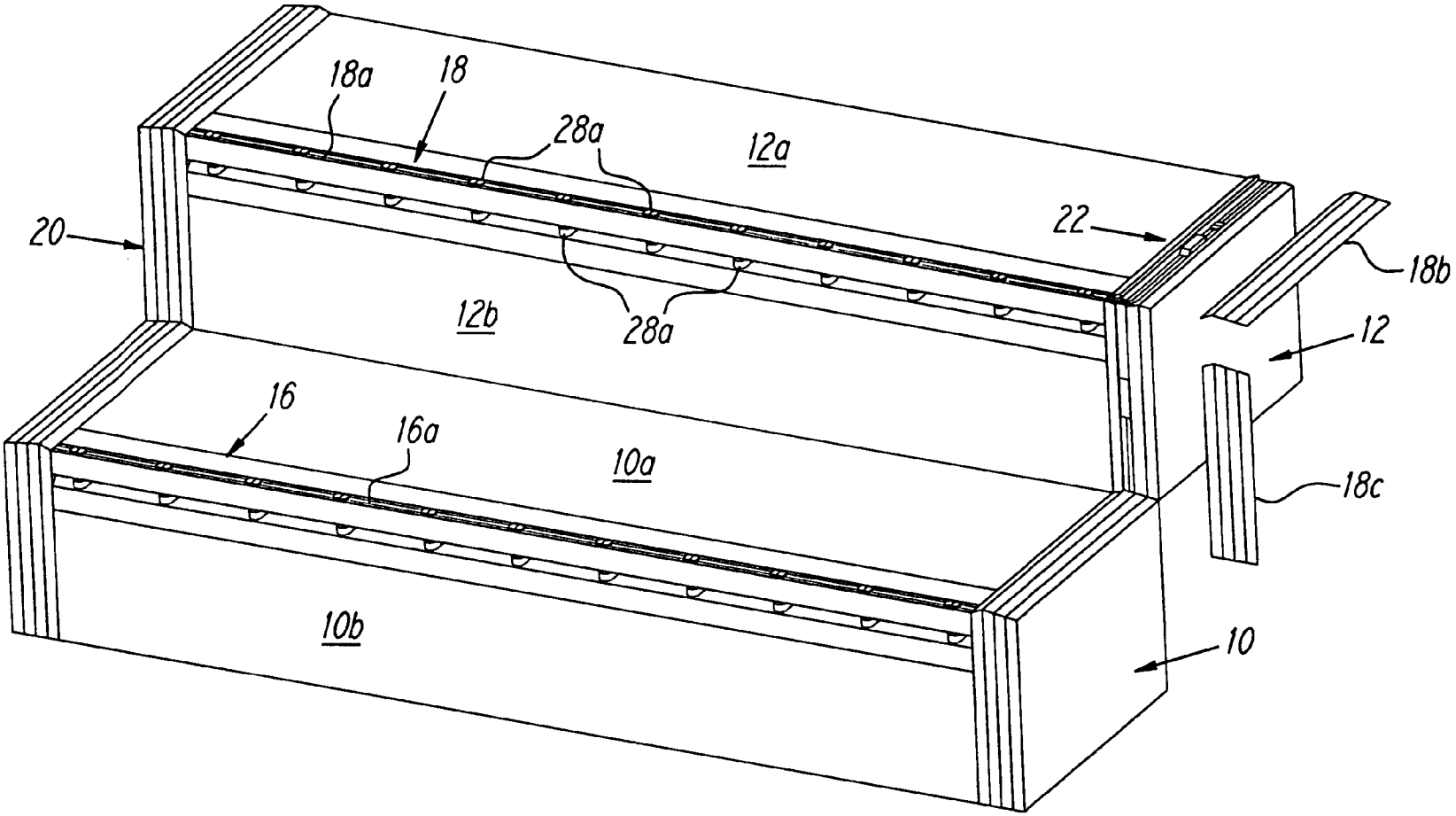
FIG. 1 is a perspective view of part of a stairway illustrating exemplary step lighting of the present invention.

Turning now to the drawings, and first to FIG. 1, a portion of a stairway is shown comprising first and second steps 10 and 12 each comprising a respective step top 10a and 12a and riser 10a and 12b. A step nose extrusion 16 is provided for the step 10 and extrusion 18 is provided for the step 12, it being understood that a fewer or greater number of steps than those shown may be involved. These extrusions are, for example, typically thirty inches or so wide and extend substantially from end to end of the step edge. They contain a plurality of spaced, small sources of light. Wireways 20 and 22 on the respective sides of the steps 10 and 12 are illustrated, and these contain the electrical wiring harnesses for supplying power to lights mounted on the nose extrusions 16 and 18. The wireways can be installed on both sides as shown or on only one side of the steps, depending on the wiring requirements of the particular installation, and these typically include an extrusion 20, 22 as shown, along with snap-on cover sections such as 18b and 18c as seen to the upper right in FIG. 1 for step 12. Each of the extrusions has an upper clear or frosted lens section 16a, 18a which will be explained in greater detail in connection with a discussion of FIGS. 2–4.

Each of the extrusions 16 or 18, as will be described in detail below, preferably is a plastic extrusion and includes a light directing member therein for directing light upwardly and downwardly, and includes therein a string of lights, either incandescent, LED or the like extending substantially from end to end of the extrusion. The light directing member can be designed to reflect the light from the string of lights, or to refract the light as by prism elements or sections, or both reflect and transmit the light upwardly and downwardly, or both transmit and refract the light so as to provide suitable illumination for the top edge of the step when someone is walking down the stairs, and further to provide suitable illumination for the riser and/or the top of a step or steps below as one ascends the stairway. Furthermore, the extrusions preferably include slots for receiving carpet edges of carpet on the tops of the steps and on the risers of the steps.

Figure 2:
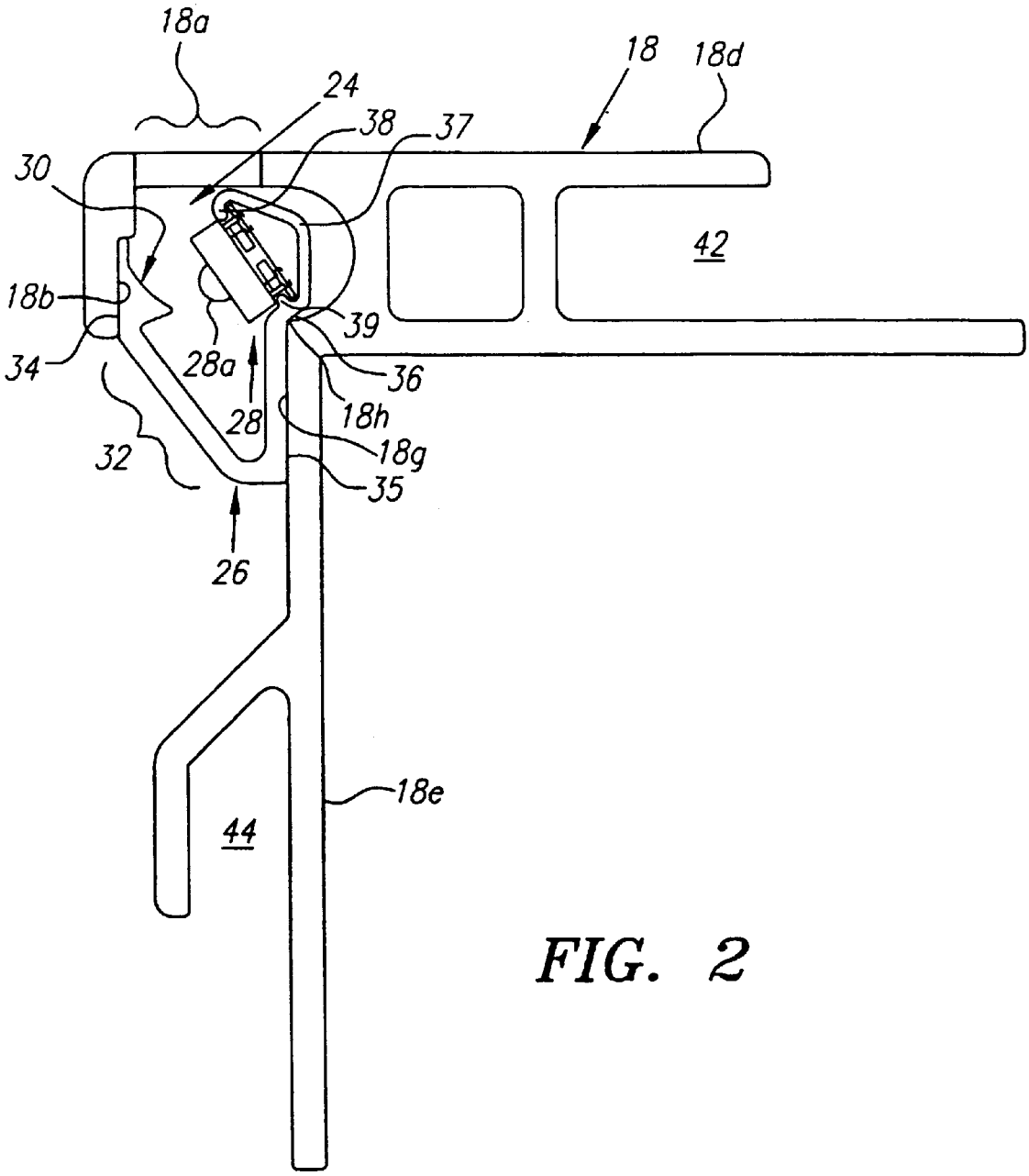
FIG. 2 is a cross-section view of a first embodiment of a step lighting system of the present invention.

Turning now to FIG. 2, a first embodiment of the present invention is illustrated. This Figure is a cross-section view of a stair nose extrusion as well as of a light directing member, along with a lighting strip. For discussion purposes, the extrusion shown in FIG. 2 is considered to be that of the top step, namely extrusion 18 of FIG. 1. It includes top 18d and riser 18e sections at a substantially right angle or L-shaped cross-section to mate and be secured to the top and front edges of a step (not shown in FIG. 2). It further includes a channel 24 for receiving a light directing member 26 and a lighting strip 28. In this embodiment, light from the strip 28 is reflected by a reflector 30 of the member 26 upwardly, and the strip 28 is positioned to direct light downwardly from the strip 28 through a clear or translucent section 32 of the member 26. The light reflected upwardly passes through the clear or frosted lens 18a of the extrusion 18 thereby emanating from the top of the stair nose, and the light through section 32 impinges downwardly directly toward the top of the next lower step and/or onto the riser 12b. The lighting strip typically has LED's spaced 2–4 inches apart across the width of the extrusion (note the light sources 28a as seen in FIG. 1 which extend across the nose of each of the steps).

Considering the light directing member 26 in greater detail, the same preferably is extruded of clear PVC into the cross-sectional shape as seen in FIG. 2, and extends substantially from one end to the other of extrusion 18. The reflector 30 thereof preferably is provided via silver polyester tape applied directly to the member at 30 so as to reflect light from light sources 28a of the strip 28 upwardly through the lens 18a of the extrusion 18. The extrusion 18 typically is extruded PVC, with the lens 18a being extruded simultaneously therewith of clear or no translucent PVC in a conventional manner.

The light directing member 26 has a forward edge 34 which abuts a rear facing edge 18f of the extrusion 18, and has a rear facing edge 35 that abuts a forward face 18g of the extrusion 18. Each of 34, 35, 18f and 18g preferably can be a flat surface or flat edges as seen in FIG. 2 to facilitate sliding the member 26 into the channel 24 of the extrusion 18. The rear facing edge 35 of member 26 angles or curves rearwardly at 36 thereby forming a hook for causing the member 26 to be retained and secured within the channel 24 by virtue of a corner 18h of the extrusion 18 as well as the surfaces 18f and 18g thereof.

The light directing member 26 further includes a concave or essentially a V-shaped upper section 37 which has fingers or ears 38 and 39 for engaging and holding light sources 28a of the strip 28. These light sources 28a are conventional, and typically comprise LED's as noted earlier, and which are connected together by suitable electrical conductors which, in turn, are connected to a low voltage power supply (not shown) for supplying current to the light sources. With the configuration of the upper section 37 of the member 26, it is relatively easy to slide the light sources 28 into the section 37 during manufacture such that members 26 of an appropriate length (e.g., of a length to fit into the extrusions 16 and 18 as seen in FIG. 1) can be provided. Similarly, the extrusions 16 and 18 can be cut to the appropriate lengths at the factory so that when the extrusions and the light directing members are delivered to the job site, they are already cut to the appropriate lengths to thereby simplify assembly onto the edge or nose or the stairs with screws, adhesives, or any other suitable fastening means conventionally used.

The extrusion 18 also includes an upper slot 42 for receiving the end of carpet on top of the step, and a lower slot 44 for receiving the end of carpet or other decorative material provided on the riser below.

Figure 3:
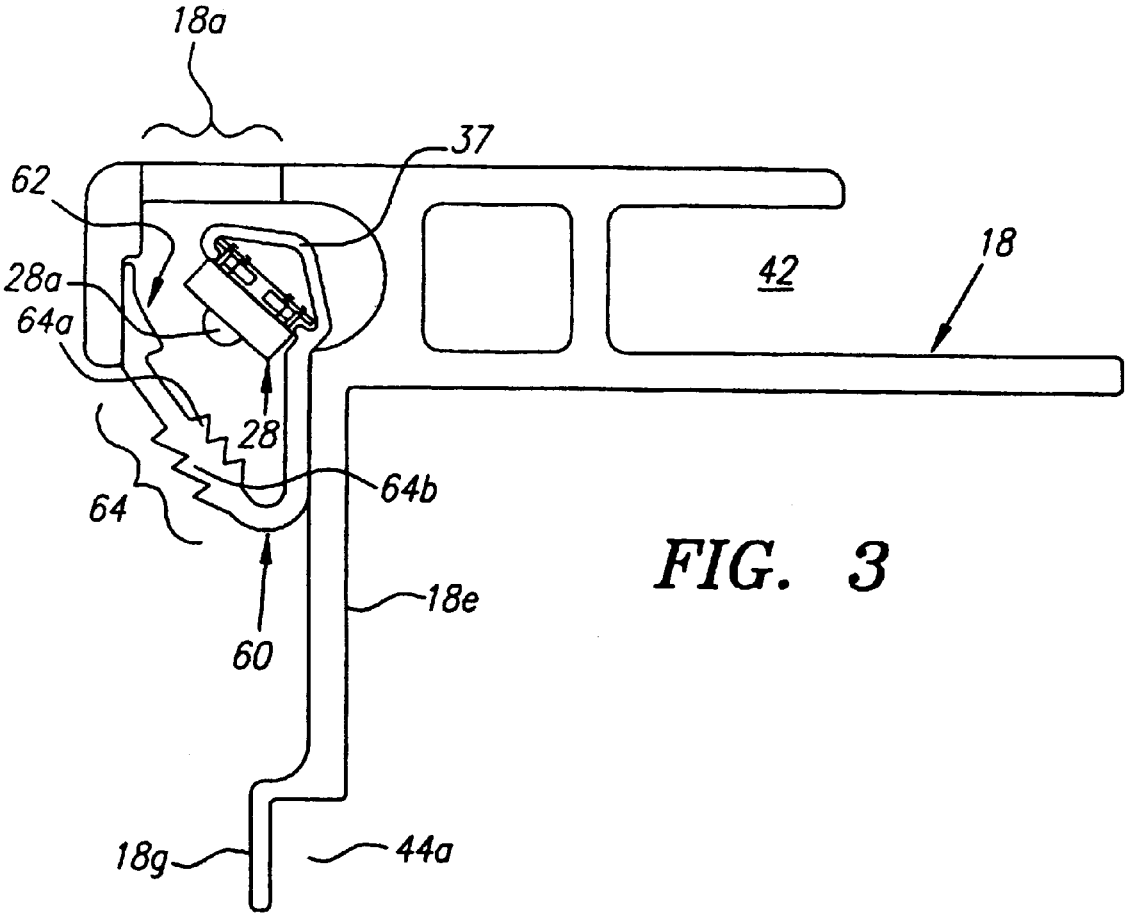
FIG. 3 illustrates another embodiment thereof using a prism lens assembly.

Another embodiment is illustrated in FIG. 3 wherein a light directing member 60 uses a reflective surface 62 (similar to 30 of FIG. 2) for reflecting light upwardly from the lighting string 28, and a Fresnel or prism type lens section 64 for refracting and directing the light downwardly. The structure and shape of the member 60 is otherwise the same as member 26. The extrusion 18 and lighting string 28 are the same as those of FIG. 2, except the extrusion at the carpet slot 44a does not have a rear vertical leg as in FIG. 2 and thus an end of the carpet is held between the extension 18 at 44a and the face of the step. The section 18e of the extrusion 18 thus does not extend out as far (as that of FIG. 2) and accordingly blocks less light aimed at the riser and step below.

As in the case of FIG. 2, light directing member 60 preferably is extruded from clear polycarbonate to provide both the lens and a holder for the lighting string 28. A silver polyester or other reflective tape can also be provided at 60. This light directing member 60 includes a plurality of segments on each side, such as 64a and 64b, to provide the degree of illumination desired for the downwardly directed light to the riser and step below. The remainder of the member 60 is like member 26 in FIG. 2, the difference being in sections 32 in FIG. 2 and 60 in FIG. 3, and each is extruded preferably of clear PVC.

Figure 4:
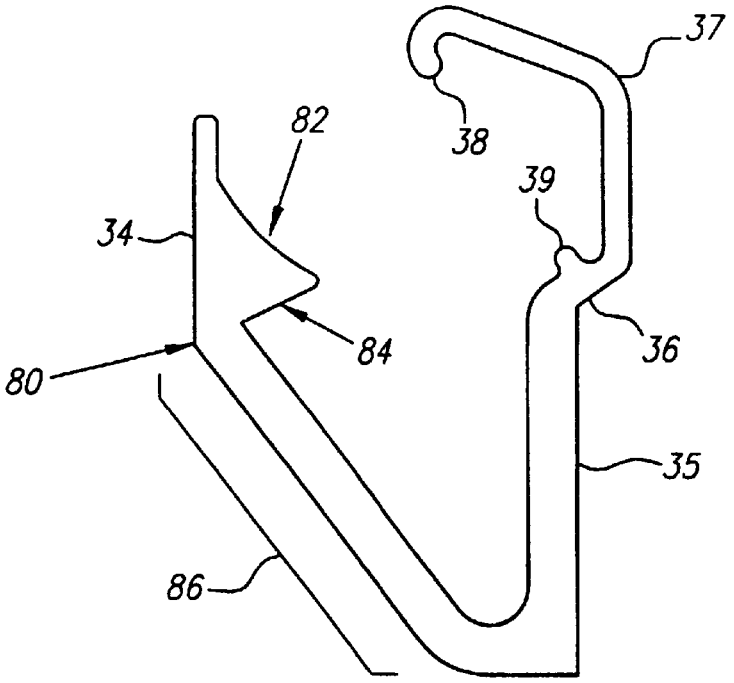
FIG. 4 illustrates a further embodiment of a light directing member of a step lighting system of the present invention using a dual reflector system.

The third embodiment of a light directing member 80 is shown in FIG. 4 and is like that of FIG. 2 but uses an additional reflector. It is used with the same type nose extrusion 18 (not shown in FIG. 4). A first reflector 82 (like 30 of FIG. 2 and 62 of FIG. 3) is used and an additional reflector 84, along with a clear lens section 86 for the light directing member 80. The extrusion for the member 80 is the same as in FIG. 2 with the exception of the added reflector 84, and the lighting string 28 is the same. The reflectors 84 and 82 are provided by the silver polyester tape as in the previous embodiments.

Figure 5:
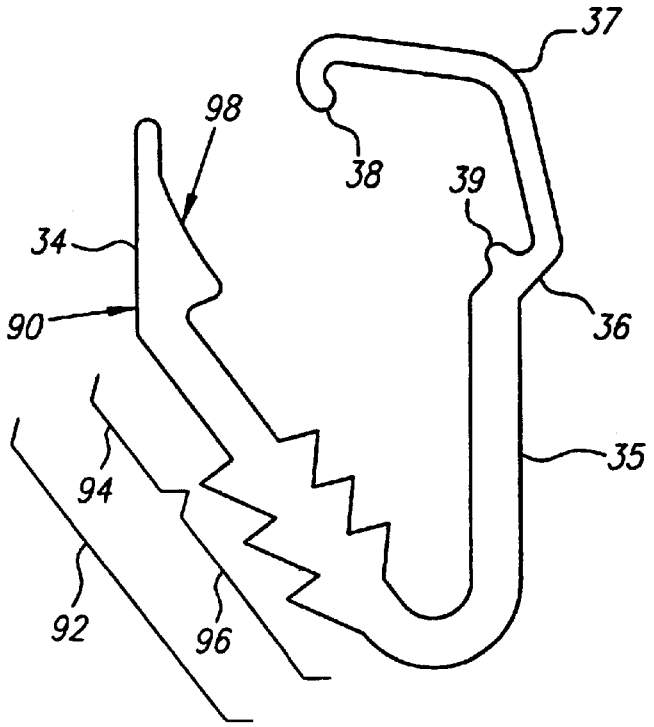
FIG. 5 illustrates a preferred embodiment of a light directing member of a step lighting system of the present invention using a combined lens and prism lens assembly.

FIG. 5 illustrates a preferred embodiment of a light directing member 90, and which is similar to that of FIGS. 2 and 3 and combines the best features of both. It has been found that in some applications the prism 64 arrangement of FIG. 3 may not provide as much light as is desired on the step below. In the embodiment of FIG. 5 the overall lens section 92 has both a clear lens section 94 and a prism-type lens section 96. By eliminating the upper prism section and providing a clear lens section 94, more light is directed downwardly toward the step below, whereas the prism section 96 directs light toward the riser. It is believed that this configuration provides a better balance of light onto the riser and the step below in some applications than the full prism 64 arrangement of FIG. 3 which provides more light on the riser and less on the step below than the arrangement of FIG. 5. The light directing member 90 of FIG. 5 includes a reflector 98 similar to the reflectors 30, 62 and 82 of FIGS. 2–4, and the structure and shape of the member 90 is otherwise the same as member 26.

Figure 6:
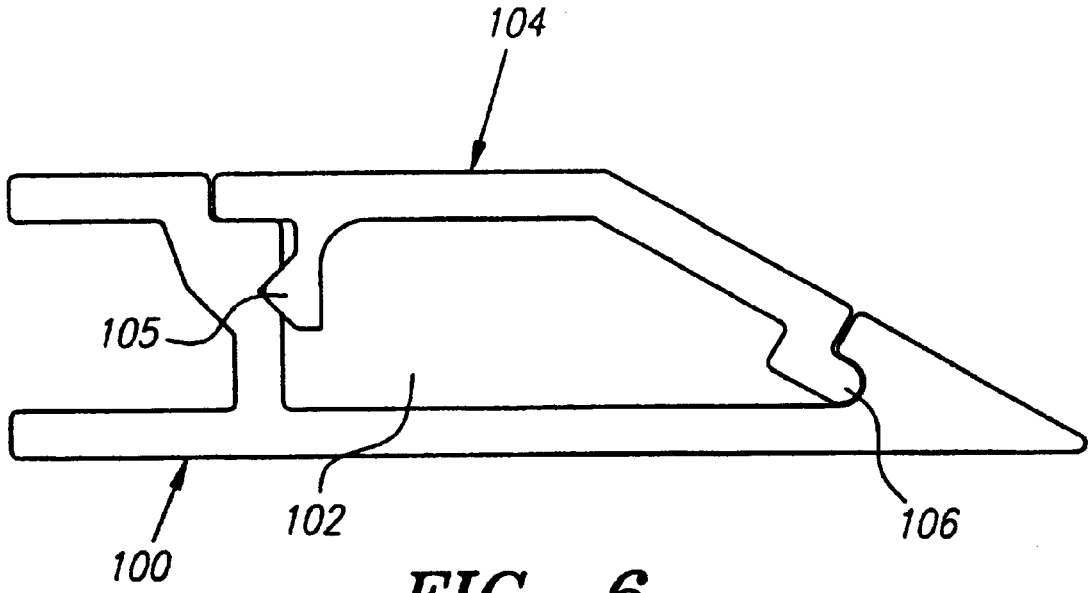
FIG. 6 shows a cross-section view of a wireway for use with the stair nose extrusions hereof.

Finally, FIG. 6 illustrates a cross-sectional view of a typical wireway extrusion 100 used with the stair nose extrusions 16, 18 to provide a channel for wires connecting the lighting strips for each of the extrusions to a suitable source of electrical power. This extrusion 100 includes an interior channel 102 for receiving the connecting wires (not shown), and which is covered by a cover 104 similar to 18b and 18c of FIG. 1. The cover 104 snaps in at 105, 106 as seen in FIG. 6 to provide a suitable cover over the electrical conductors.

While embodiments of the present invention have been shown and described, various modifications may be made without departing from the scope of the present invention, and all such modifications and equivalents are intended to be covered.

What is claimed is:

1. A step lighting fixture comprising an extrusion having a channel for receiving a light directing member and lighting string holder, the extrusion having first and second sections substantially at a right angle to each other for mating with a step edge, a light directing member disposed in the channel of the extrusion and being configured to slide into the channel and be retained therein, the light directing member having a first reflector area for reflecting light upwardly through the extrusion to direct light upwardly from the step lighting fixture capable of being viewed by one walking down a step, and the light directing member further including a second area for enabling light to be directed downwardly toward a riser and/or a step below, and including a holder section for holding and supporting a lighting strip member, and a lighting strip member including a plurality of light sources disposed in the holder section of the light directing member for thereby providing a fixture for directing light from the lighting strip member both upwardly and downwardly from a single lighting strip member.

2. A step lighting fixture as in claim 1 wherein the extrusion is formed of extruded PVC and with a lens section in the first section thereof through which light reflected from the reflector area of the light directing member can pass through.

3. A step lighting fixture as in claim 2 wherein the lens section is translucent.

4. A step lighting fixture as in claim 1 including a second reflector area for reflecting light to enhance the light directed downwardly toward the step below.

5. A step lighting fixture as in claim 1 wherein the light directing member has a segmented section for directing light downwardly toward a riser below.

6. A step lighting fixture as in claim 5 wherein the segmented area is a prism type section.

7. A step lighting fixture as in claim 1 wherein the light directing member includes a substantially clear section for allowing light from the lighting strip member to impinge downwardly toward the step below.

8. A step lighting fixture as in claim 7 wherein the light directing member also includes a segmented section for directing light toward a riser below.

9. A step lighting fixture as in claim 1 wherein the light directing member has first and second edges for mounting with interior areas of a channel of the extrusion for supporting and securing the light directing member within the extrusion, and wherein the light strip member comprises a plurality of LED's disposed in a spaced apart relationship from one end to the other of the light directing member.

10. A step lighting fixture as in claim 9 wherein the light directing member includes a holder section for receiving and holding the lighting strip member.

11. A step lighting fixture as in claim 10 wherein the light directing member includes a clear lens section for directing light toward a step below and a segmented section for directing light toward a riser below.

12. A method of providing low level illumination at a stair edge via a step lighting fixture having a plurality of light sources extending substantially across the vicinity of a stair edge comprising reflecting light from the light sources upwardly from an upper stair edge, and directing light from the light sources downwardly toward a next lower stair, all with a single string of light sources providing the upwardly and downwardly directed illumination.

13. A method as in claim 12 comprising the step of further reflecting light from the light sources to enhance the downwardly directed illumination.

14. A method as in claim 12 further including refracting light from the light sources downwardly.

15. A method as in claim 12 including transmitting light downwardly toward a step below and refracting light downwardly toward a riser below.

*16. A step lighting fixture comprising:*

*an extrusion having a channel for receiving a lighting strip member, the extrusion having first and second sections substantially at a right angle to each other for mating with a step edge,*

*a light directing member extending along the extrusion for enabling light to be directed from within the channel downwardly toward a riser and/or a step below,*

*a lens section extending along a top section of the extrusion for directing light from within the channel upwardly from the step lighting fixture capable of being viewed by one walking down a step, and*

*a lighting strip member including a plurality of light sources received in the channel for providing a fixture for directing light from the lighting strip member both upwardly and downwardly from a single lighting strip member.*

*17. A step lighting fixture as in claim 16, wherein the light directing member is slidably received in the channel.*

*18. A step lighting fixture as in claim 16, further comprising a holder section extending along the channel for holding and supporting the lighting strip member.*

*19. A step lighting fixture as in claim 18, wherein the light directing member includes the holder section thereon.*

*20. A step lighting fixture as in claim 16, wherein the light directing member comprises a lens for directing light downward.*

*21. A step lighting fixture as in claim 20, wherein the lens comprises a Fresnel or prism lens for refracting and directing light downwardly.*

*22. A step lighting fixture as in claim 16, wherein the light directing member extends between the first section and a cover section of the extrusion that extends parallel to the first section.*

*23. A step lighting fixture as in claim 16, further comprising a first reflector area within the channel for reflecting light from the lighting strip member upwardly through the lens section.*

*24. A step lighting fixture as in claim 23, wherein the light directing member has the first reflector area thereon.*

*25. A step lighting fixture as in claim 16, wherein the lighting strip member comprises a plurality of LED's disposed in a spaced apart relationship from one end to the other end of the extrusion.*

*26. A step lighting fixture as in claim 16, wherein the extrusion is formed of extruded PVC with the lens section in the first section thereof.*

*27. A step lighting fixture as in claim 16, wherein the extrusion includes a slot for receiving a carpet edge.*

*28. A step lighting fixture comprising:*

*an extrusion having a channel for receiving a lighting strip member, the extrusion having top and riser sections substantially at a right angle to each other for mating with a step edge,*

*a light directing member extending substantially from one end to the other end of the extrusion for enabling light from within the channel to be directed downwardly toward a riser and/or a step below,*

*a lens section extending along the top section of the extrusion for directing light from within the channel upwardly from the step lighting fixture capable of being viewed by one walking down a step,*

*a holder section for holding and supporting a lighting strip member in the channel, and*

*a lighting strip member including a plurality of light sources disposed in the holder section for providing a fixture for directing light from the lighting strip member both upwardly and downwardly from a single lighting strip member.*

*29. A step lighting fixture as in claim 28, wherein the top section includes a slot for receiving a carpet edge.*

*30. A step lighting fixture as in claim 28, wherein the light directing member slidably engages the extrusion.*

*31. A step lighting fixture as in claim 28, wherein the light directing member includes the holder section thereon.*

*32. A step lighting fixture as in claim 28, wherein the light directing member comprises a lens for directing light downward.*

*33. A step lighting fixture as in claim 32, wherein the lens comprises a Fresnel or prism lens for refracting and directing light downwardly.*

*34. A step lighting fixture as in claim 28, further comprising a first reflector area within the channel for reflecting light from the lighting strip member upwardly through the lens section.*

*35. A step lighting fixture as in claim 34, wherein the light directing member has the first reflector area thereon.*

*36. A step lighting fixture as in claim 28, wherein the lighting strip member comprises a plurality of LED's disposed in a spaced apart relationship from one end to the other end of the extrusion.*

*37. A step lighting fixture as in claim 28, wherein the extrusion is formed of extruded PVC with the lens section in the top section thereof.*

* * * * *